Patented Jan. 3, 1950

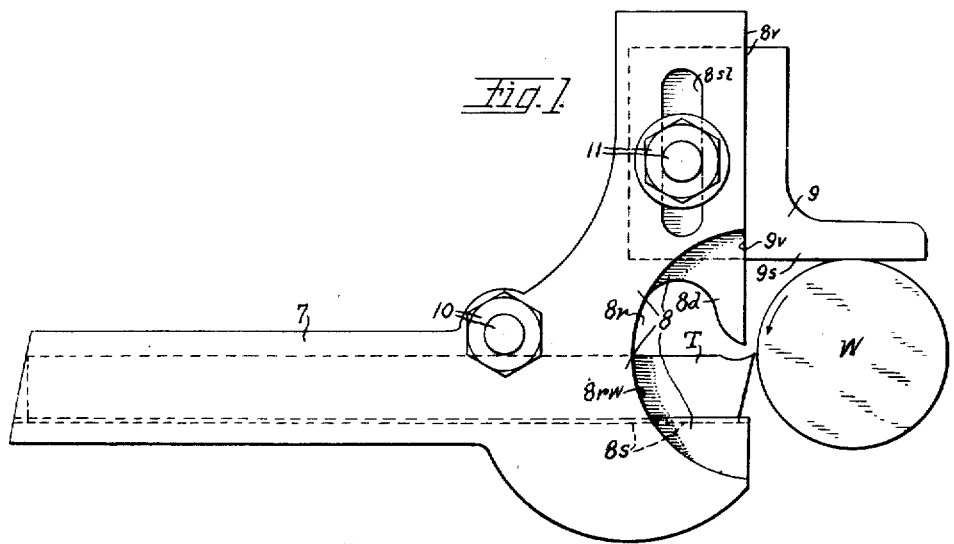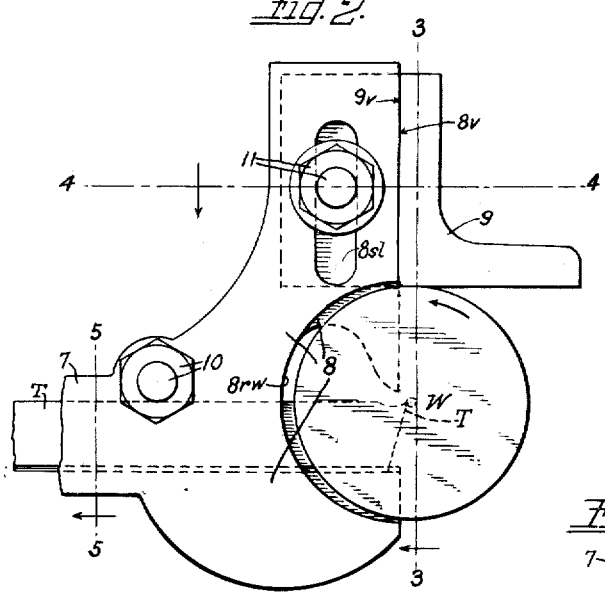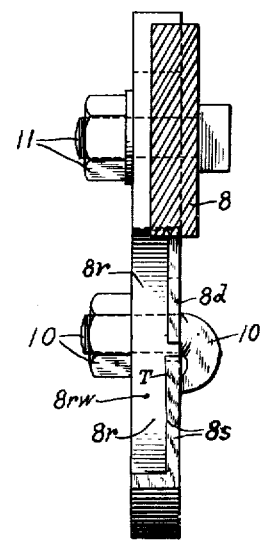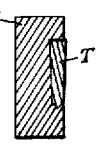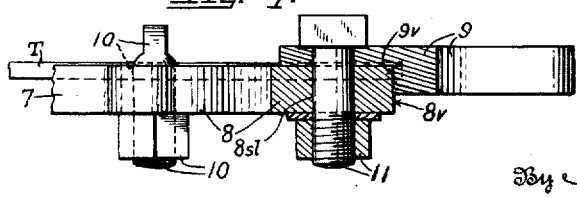

2,493,286

UNITED STATES PATENT OFFICE 2,493,286

COMBINED LATHE TOOL HOLDER AND WORK STABILIZER

Henry Guerin, Elberon, N. J.

Application August 7, 1947, Serial No. 767,276

3 Claims. (Cl. 82—35)

This invention relates to metal working; and especially to a combined lathe-tool holder and work-stabilizer.

When work such as a rod or shaft of considerable length and small cross section is chucked in a lathe and is being turned while it is being cut off or grooved peripherally and cut inward towards its center, the pressure of the cutting-off tool under the side being cut has a tendency to cause the work to climb or bend upward over the cutting edge, first resulting in the noise and rough cutting known as "chattering"; and as the peripheral groove is deepened and the cross-section reduced, the rod is likely to become so badly bent as to stop the lathe, break some part thereof, break the work at the reduced cross section, or distort the work to such an extent that it is useless for the purpose intended. Even when the work is comparatively short and of large cross section, and even when supported at both ends when the peripheral groove is started, such bending and chattering, etc., are likely to occur when the cross section is much reduced at bottom of the peripheral groove; and the danger of bending, etc., is increased by the metal shavings becoming packed in the groove and against the cutting edge of the cutting tool.

Therefore: One object of the invention is to avoid all the above described dangers and inconveniences, first, by providing a work-stabilizing member that is vertically adjustable to different positions, and securable in each of said positions according to the respective diameters of the pieces of work being turned and grooved, namely, positioned against the top of each of such pieces of work, so the work cannot bend upward; second, by providing a thin-wide tool-end support or shelf on which the cutting end of the cutting tool is seated and which enters the groove more and more as the groove is deepened by the cutting tool, thereby to prevent the cutting tool from even slightly bending or breaking; and third, providing a thin-wide shavings-deflector only slightly thinner than the cutting tool, in a proper position over the edge of the cutting tool to prevent the shavings from curling over into the groove and becoming packed therein.

Another object of the tool-end support and shavings-deflector is to prevent either wide surface of the cutting tool from rubbing against the wall of the groove and becoming detrimentally heated; also to absorb and conduct the heat of friction from the work into the head of the tool holder whence it becomes conducted into the surrounding air.

Other objects and important features are pointed out or implied in the following details of description, in connection with the accompanying drawings in which:

Fig. 1 is a right-side view of the practical form of my invention in connection with a piece of work shown as an end portion of a rod or shaft in position, as if chucked in a lathe and thereby held in a position where the cutting tool is about to start cutting the peripheral groove while the work is turned in the direction of the bent arrow, the top of the work being against the stabilizing member that is secured against rising.

Fig. 2 is a right-side view of the main portion of the invention shown in Fig. 1; but the greater part of the shank being broken off; the stabilizing member being secured in a higher position, so it is against the upper side of a piece of work of larger cross-section than that shown in Fig. 1, while the cutting tool has deepened the groove approximately to the axial center of the work, and the main portions of the tool-end-support being shown in dotted lines within the peripheral groove.

Fig. 3 is a vertical sectional view along the line 3—3 of Fig. 2, the work omitted.

Fig. 4 is a horizontal sectional view along the line 4—4 of Fig. 2, the work omitted.

Fig. 5 is a vertical sectional view along the line 5—5 of Fig. 2.

Referring to these drawings in detail in which similar letters and figures refer to similar parts in the several views, the invention is described in detail as follows:

In rather broad terms, the invention comprises a main body-member including a shank 7 adapted to be secured to and operated by a tool-carriage or tool-post (not shown) of a lathe, and also includes a head or front portion 8 that has therein a recess 8r adapted to receive a part of a rod or shaft that constitutes work at W, when the work is chucked in and turned by a lathe and is being grooved peripherally and inwardly toward its axis, the front portion 8 having a normally horizontal shelf or tool-end-support to receive and support a thin cutting-off tool T. The shelf 8s extends from said shank past the rear wall 8rw of said recess 8r and substantially to the open front of said recess 8r, the front portion of said shelf having plane vertical sides and being of substantially equal thinness from top to bottom and from its front end to the rear end of said recess, as clearly shown in Figs. 1 and 3. The front portion 8 comprises a shaving-deflector 8d that projects downward from an upper edge of said recess and is of substantially equal thinness throughout and has plane lateral sides substantially level with the first said vertical sides and sufficiently spaced above the latter to permit the cutting end of the cutting-off tool to be disposed on said shelf and under said shavings-deflector.

The invention also includes in the combination, a vertically adjustable work-stabilizing member 9 having a lower substantially level and horizontal surface 9s that projects forward from the upper portion of said recess; also, means 10 to clamp the cutting tool T in various adjustments on the shelf or tool-end-support 8s; also a single screw-clamp 11 co-operatively engaged with said front portion 8 to secure said stabilizing member 9 to the front end-portion in such relation that said plane vertical surface is cooperative therewith and with the extreme front-end of said front-end-portion so as to keep said lower surface horizontal in each of its vertical adjustments.

The front end portion 8 has a plane vertical surface 8v against which is slidably seated a plane vertical surface 9v of the stabilizing member 9; and these plane surfaces are parallel with the slot 8sl; so the bolt at 11 keeps the plane surfaces 8v and 9v together at each of the vertical adjustments of the member 9, and the lower surface of the member 9 is level at all of its different adjustments. The elimination of a bolt and nut, or the sufficiency of only one bolt and nut, not only minimizes the cost of manufacture of the device, but also eliminates the necessity of actuating more than one clamping means 11 each time the member 9 needs to be adjusted.

I have no intention to limit my patent protection to the precise details of construction and arrangement as described in the foregoing and shown in the drawings, for the invention is susceptible of numerous changes within the scope of the inventive ideas as implied and claimed.

This invention is claimed as follows:

1. In a combined lathe-tool-holder and work-stabilizer, a main body-member including a shank adapted to be secured to and operated by a tool-carriage or tool-post of a lathe, and also including a front portion that has therein a recess adapted to receive a part of a rod or shaft when the latter is chucked in and turned by a lathe and is being grooved peripherally and inwardly toward its axis, said front portion having a normally horizontal shelf to receive and support a thin cutting-off tool, said shelf extending from said shank past the rear wall of said recess and substantially to the open front of said recess, the front portion of said shelf having plane vertical sides and being of substantially equal thinness from top to bottom and from its front end to the rear end of said recess, said front portion comprising a shavings-deflector that is integrally formed thereon and projects downward from an upper edge of said recess and is of substantially equal thinness throughout and has plane lateral sides substantially level with the first said vertical sides and sufficiently spaced above the latter to permit the cutting end of the cutting-off tool to be disposed on said shelf and under said shavings deflector.

2. The structure defined by claim 1, in combination with a vertically adjustable work-stabilizing member having a lower substantially level and horizontal surface that projects forward from the upper portion of said recess, said main body comprising a substantially vertical front surface against which is slidably seated said work-stabilizing member to prevent said horizontal surface from becoming inclined.

3. The structure defined in claim 1, in combination with means to clamp said tool in various adjustments on said shelf, and a vertically adjustable work stablizing member having a plane horizontal lower surface and a plane vertical surface and a securing flange, and a single screw-clamp co-operative with said front end portion to secure said stabilizing member to said front-end-portion in such relation that said plane vertical surface is co-operative therewith and with the extreme front-end of said front end-portion so as to keep said lower surface horizontal in each of its vertical adjustments.

HENRY GUERIN.

REFERENCES CITED

The following references are of record in the file of this patent:

UNITED STATES PATENTS

| Number | Name | Date |
| --- | --- | --- |
| 488,145 | Hurley | Dec. 13, 1892 |
| 1,161,056 | Liebstein | Nov. 23, 1915 |
| 1,863,907 | Luers | June 21, 1932 |
| 2,373,301 | Erickson | Apr. 10, 1945 |